United States Patent
Jibbe et al.

(10) Patent No.: US 10,691,339 B2
(45) Date of Patent: Jun. 23, 2020

(54) METHODS FOR REDUCING INITIALIZATION DURATION AND PERFORMANCE IMPACT DURING CONFIGURATION OF STORAGE DRIVES

(71) Applicant: NetApp, Inc., Sunnyvale, CA (US)

(72) Inventors: Mahmoud K. Jibbe, Wichita, KS (US); Charles Binford, Wichita, KS (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 16/393,433

(22) Filed: Apr. 24, 2019

(65) Prior Publication Data

US 2019/0250829 A1 Aug. 15, 2019

Related U.S. Application Data

(63) Continuation of application No. 15/433,716, filed on Feb. 15, 2017, now Pat. No. 10,303,362.

(51) Int. Cl.
   *G06F 3/06* (2006.01)
(52) U.S. Cl.
   CPC .......... *G06F 3/0607* (2013.01); *G06F 3/0632* (2013.01); *G06F 3/0683* (2013.01); *G06F 3/061* (2013.01)
(58) Field of Classification Search
   CPC .... G06F 3/0607; G06F 3/0632; G06F 3/0683; G06F 3/061
   See application file for complete search history.

(56) References Cited

U.S. PATENT DOCUMENTS

| | | |
|---|---|---|
| 7,424,637 B1 | 9/2008 | Schoenthal |
| 7,539,838 B1 | 5/2009 | Todd |
| 8,713,356 B1 | 4/2014 | Chan |
| 9,417,822 B1 | 8/2016 | Ballance |
| 2004/0199515 A1 | 10/2004 | Penny |
| 2004/0216012 A1 | 10/2004 | Ashmore |
| 2005/0091449 A1 | 4/2005 | Cherian |
| 2005/0114593 A1 | 5/2005 | Cassell |
| 2005/0114728 A1 | 5/2005 | Aizawa |
| 2006/0200700 A1 | 9/2006 | Malcolm |
| 2007/0157002 A1 | 7/2007 | Zelikov |
| 2008/0256420 A1* | 10/2008 | Hafner ............... G06F 11/1004 714/770 |
| 2009/0063767 A1 | 3/2009 | Graves |
| 2014/0047144 A1 | 2/2014 | Haga |
| 2015/0095599 A1 | 4/2015 | Sueda |
| 2017/0251058 A1 | 8/2017 | Zachariassen |
| 2018/0121095 A1 | 5/2018 | Atia |

* cited by examiner

*Primary Examiner* — Hiep T Nguyen
(74) *Attorney, Agent, or Firm* — Haynes and Boone, LLP

(57) ABSTRACT

A method, non-transitory computer readable medium, and device that assists with reducing initialization duration and performance impact during configuration of storage drives includes identifying a plurality of new storage drives in a storage system. Next, one or more zeroed out storage drives is identified from the identified plurality of new storage drives based on information present in a data portion of each the identified plurality of new storage drives. A volume group comprising the identified one or more zeroed out drives is created and this created volume group is provided for data operation.

20 Claims, 4 Drawing Sheets

METHODS FOR REDUCING INITIALIZATION DURATION AND PERFORMANCE IMPACT DURING CONFIGURATION OF STORAGE DRIVES

CROSS-REFERENCE TO RELATED APPLICATIONS

This application is a continuation of U.S. application Ser. No. 15/433,716, filed Feb. 15, 2017, the disclosure of which is incorporated herein by reference in its entirety.

FIELD

This technology generally relates to storage management and, more particularly, methods for reducing an initialization duration and performance impact during configuration of storage drives.

BACKGROUND

In prior technologies, arrays were required to initialize all blocks of drives including storage volumes that were used for storage. Due to a very large number of blocks in drives, users in prior technologies had to wait for a very long duration to access the volume because initialization of the data blocks in drives took a very long time. Some prior technologies allowed the initialization to be performed in the background, allowing access to read and write the volume before the initialization was complete, but at a cost of significantly reduced performance of the arrays and very high latency in responding to the read and write requests.

DETAILED DESCRIPTION

Figure 1:
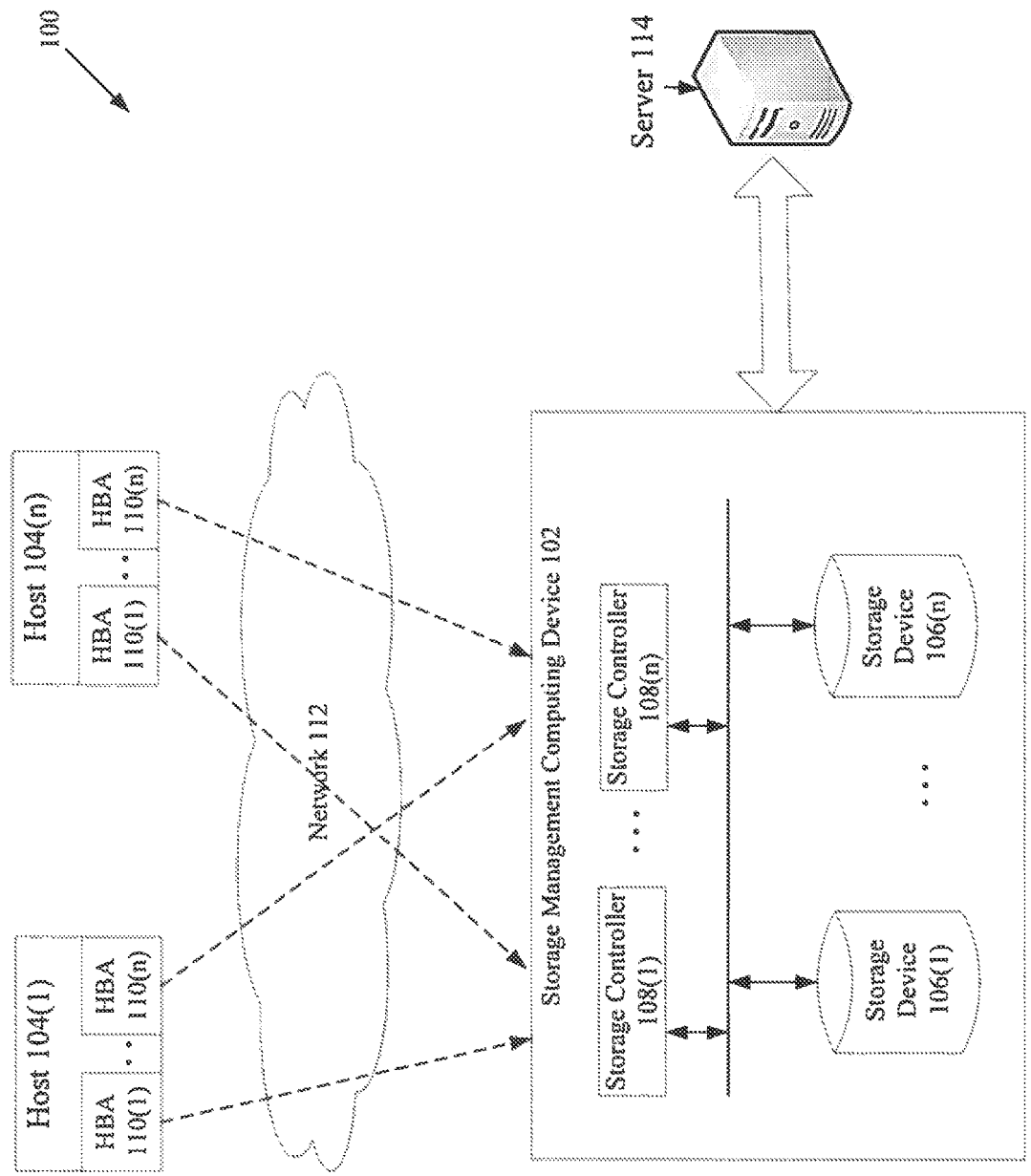
FIG. 1 is a block diagram of an environment with an exemplary storage management computing device.

Data storage architecture 100 is described with reference to FIG. 1. The storage architecture 100 includes a storage management computing device 102 in communication with a plurality of hosts 104(1)-104(n). The storage management computing device 102 is a device that processes data transactions on behalf of other computing systems including one or more hosts, exemplified by the plurality of hosts 104(1)-104(n). The storage management computing device 102 may receive data transactions (e.g., requests to read and/or write data) from one or more of the hosts 104(1)-104(n), and take an action such as reading, writing, or otherwise accessing the requested data. For many exemplary transactions, the storage management computing device 102 returns a response such as requested data and/or a status indictor to the requesting one of the plurality of hosts 104(1)-104(n). It is understood that for clarity and ease of explanation, only a single storage management computing device 102 is illustrated, although any number of plurality of hosts 104(1)-104(n) may be in communication with any number of storage management computing devices 102.

While the storage management computing device 102 and each of the plurality of hosts 104(1)-104(n) are referred to as singular entities, a storage management computing device 102 or the plurality of hosts 104(1)-104(n) may include any number of computing devices and may range from a single computing system to a system cluster of any size. Accordingly, each storage management computing device 102 and the plurality of hosts 104(1)-104(n) includes at least one computing system, which in turn includes a processor such as a microcontroller or a central processing unit (CPU) operable to perform various computing instructions. The instructions may, when executed by the processor, cause the processor to perform various operations described herein with the storage controllers 108(1)-108(n) in the storage management computing device 102 in connection with examples of the present disclosure. Instructions may also be referred to as code.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage management computing device 102, the exemplary storage management computing device 102 contains plurality of storage devices 106(1)-106(n) and responds to the plurality of hosts 104(1)-104(n) data transactions so that the storage devices 106(1)-106(n) appear to be directly connected (local) to the plurality of hosts 104(1)-104(n). In various examples, the plurality of storage devices 106(1)-106(n) include hard disk drives (HDDs), solid state drives (SSDs), optical drives, and/or any other suitable volatile or non-volatile data storage medium. In some examples, the plurality of storage devices 106(1)-106(n) are relatively homogeneous (e.g., having the same manufacturer, model, and/or configuration). However, it is also common for the storage management computing device 102 to include a heterogeneous set of plurality of storage devices 106(1)-106(n) that includes storage devices of different media types from different manufacturers with notably different performance.

The storage management computing device 102 may group the plurality of storage devices 106(1)-106(n) for speed and/or redundancy using a virtualization technique such as RAID (Redundant Array of Independent/Inexpensive Disks). The storage management computing device 102 may also arrange the plurality of storage devices 106(1)-106(n) hierarchically for improved performance by including a large pool of relatively slow storage devices and one or more caches (i.e., smaller memory pools typically utilizing faster storage media). Portions of the address space may be mapped to the cache so that transactions directed to mapped addresses can be serviced using the cache. Accordingly, the larger and slower memory pool is accessed less frequently and in the background. In an embodiment, a storage device includes HDDs, while an associated cache includes SSDs.

In an example, the storage management computing device 102 may group the plurality of storage devices 106(1)-106

(n) using a dynamic disk pool virtualization technique. In a dynamic disk pool, volume data, protection information, and spare capacity are distributed across each of the storage devices included in the pool. As a result, each of the plurality of storage devices 106(1)-106(n) in the dynamic disk pool remain active, and spare capacity on any given storage device is available to each of the volumes existing in the dynamic disk pool. Each of the plurality of storage devices 106(1)-106(n) in the disk pool is logically divided up into one or more data extents at various logical block addresses (LBAs) of the storage device. A data extent is assigned to a particular data stripe of a volume. An assigned data extent becomes a "data piece," and each data stripe has a plurality of data pieces, for example sufficient for a desired amount of storage capacity for the volume and a desired amount of redundancy, e.g. RAID 5 or RAID 6. As a result, each data stripe appears as a mini RAID volume, and each logical volume in the disk pool is typically composed of multiple data stripes.

The storage management computing device 102 also includes a plurality of storage controllers 108(1)-108(n) in communication with the plurality of storage devices 106(1)-106(n) and any respective caches. The plurality of storage controllers 108(1)-108(n) exercise low-level control over the plurality of storage devices 106(1)-106(n) in order to execute (perform) data transactions on behalf of plurality of the hosts 104(1)-104(n). The plurality of storage controllers 108(1)-108(n) are illustrative only; as will be recognized, more or fewer may be used in various examples. Having at least two storage controllers 108(1)-108(n) may be useful, for example, for failover purposes in the event of equipment failure of either one. The storage management computing device 102 may also be communicatively coupled to a user display for displaying diagnostic information, application output, and/or other suitable data.

For example, the storage management computing device 102 is communicatively coupled to server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size.

With respect to the plurality of hosts 104(1)-104(n), each of the plurality of hosts 104(1)-104(n) includes any computing resource that is operable to exchange data with a storage management computing device 102 by providing (initiating) data transactions to the storage management computing device 102. In an example, each of the plurality of hosts 104(1)-104(n) includes a plurality of host bus adapter (HBA) 110(1)-110(n) in communication with the plurality of storage controllers 108(1)-108(2) of the storage management computing device 102. The plurality of HBA 110(1)-110(n) provides an interface for communicating with the plurality of storage controllers 108(1)-108(n), and in that regard, may conform to any suitable hardware and/or software protocol. In other examples, the plurality of HBAs 110(1)-110(n) include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. The plurality of HBAs 110(1)-110(n) of the plurality of hosts 104(1)-104(n) may be coupled to the storage management computing device 102 by a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In other examples, the plurality of hosts 104(1)-104(n) may have multiple communicative links with a single storage management computing device 102 for redundancy. The multiple links may be provided by a single or multiple ones of the plurality of HBAs 110(1)-110(n) within the plurality of hosts 104(1)-104(n). In some examples, the multiple links operate in parallel to increase bandwidth.

To interact with (e.g., read, write, modify, etc.) remote data, a host HBA of the plurality of HBAs 110(1)-110(n) sends one or more data transactions to the storage management computing device 102. Data transactions are requests to read, write, or otherwise access data stored within a data storage device such as the storage management computing device 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage management computing device 102 executes the data transactions on behalf of the plurality of hosts 104(1)-104(n) by reading, writing, or otherwise accessing data on the relevant plurality of storage devices 106(1)-106(n). A storage management computing device 102 may also execute data transactions based on applications running on the storage management computing device 102 using the plurality of storage devices 106(1)-106(n). For some data transactions, the storage management computing device 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of the plurality of storage devices 106(1)-106(n). Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for examples where data transactions are received over a network that includes the Internet, a Wide Area Network (WAN), and/or a Local Area Network (LAN). Fibre Channel and FCoE are well suited for examples where hosts 104 are coupled to the storage management computing device 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage management computing device 102 to translate the file name into respective memory addresses. Exemplary file-level protocols include SMB/CFIS, SAMBA, and NFS. A Network Attached Storage (NAS) device is a type of storage system that responds to file-level transactions. It is understood that the scope of present technology is not limited to either block-level or file-level protocols, and in many examples, the storage management computing device 102 is responsive to a number of different memory transaction protocols.

In an embodiment, the server 114 may also provide data transactions to the storage management computing device 102. Further, the server 114 may be used to configure various aspects of the storage management computing device 102, for example under the direction and input of a user. Some configuration aspects may include definition of RAID group(s), disk pool(s), and volume(s), to name just a few examples.

According to one example, the server 114 may also send a request to the storage management computing device 102 to either enable or disable protection information (PI) for one or more specified volumes. PI, generally, refers to error checking information that may be appended to data blocks. This may be in the form of a cyclic redundancy check (CRC), for example. The one or more specified volumes are volumes, for example part of a volume group, composed of one or more storage devices 106 that are PI-capable. For example, a PI-capable plurality of storage devices 106(1)-106(n) may be one that has been formatted with byte sectors large enough to accommodate PI for each data block, such as 520 byte sectors instead of 512 byte sectors, so that 8 bytes of protection information may be generated for every 512 bytes. The size of the sectors and/or the protection information is exemplary only. The plurality of storage devices 106(1)-106(n) may be formatted to any of a variety of PI types, as will be recognized (e.g., Type 0, Type 1, Type 2, Type 3 to name some examples). The bytes formatted for PI may include the CRC (or other value) as well as one or more other tag fields (e.g., block application tag and/or block reference tag). As a result of having PI capable plurality of storage devices 106(1)-106(n) combined for a volume, the entire volume may be PI-capable.

In response to the request from the server 114 to enable or disable PI, the storage management computing device 102 may take the necessary action in response while regular operations (e.g., I/O requests from the plurality of hosts 104(1)-104(n)) continue. This involves, for either transitioning from disabled to enabled status or from enabled to disabled status, synchronizing and purging a cache associated with the specified volume. In examples where the request is a transition from disabled to enabled PI status, at least one of the storage controllers 108.a, 108.b may initiate an Immediate Availability Feature (IAF-PI) that includes an internal reconstruction operation that initializes/updates PI for every data block within the designated range. For example, the IAF-PI process is a background initialization process that reads data blocks in uninitialized regions (such as striped data), calculates various information (such as the PI for the data blocks and, where appropriate, parity information), and then stores the information in appropriate locations on the plurality of storage devices 106(1)-106(n). The IAF-PI process may begin at a lowest LBA for an LBA range of a selected plurality of storage devices 106(1)-106(n) and then sequentially work through the LBAs of the plurality of storage devices 106(1)-106(n) until it reaches the end of the LBA range. This may be referred to as "sweeping through" the plurality of storage devices 106(1)-106(n).

As data associated with I/O requests transits between a requesting one of the plurality of hosts 104(1)-104(n) and the one or more associated plurality of storage devices 106(1)-106(n) of storage management computing device 102, one or more elements along the data path may check the PI of the data to confirm the integrity of the data before passing the data on. The storage management computing device 102 may include multiple hardware and/or software components that may be utilized for this checking and other operations associated with PI, as explained further below with respect to FIG. 2.

Figure 2:
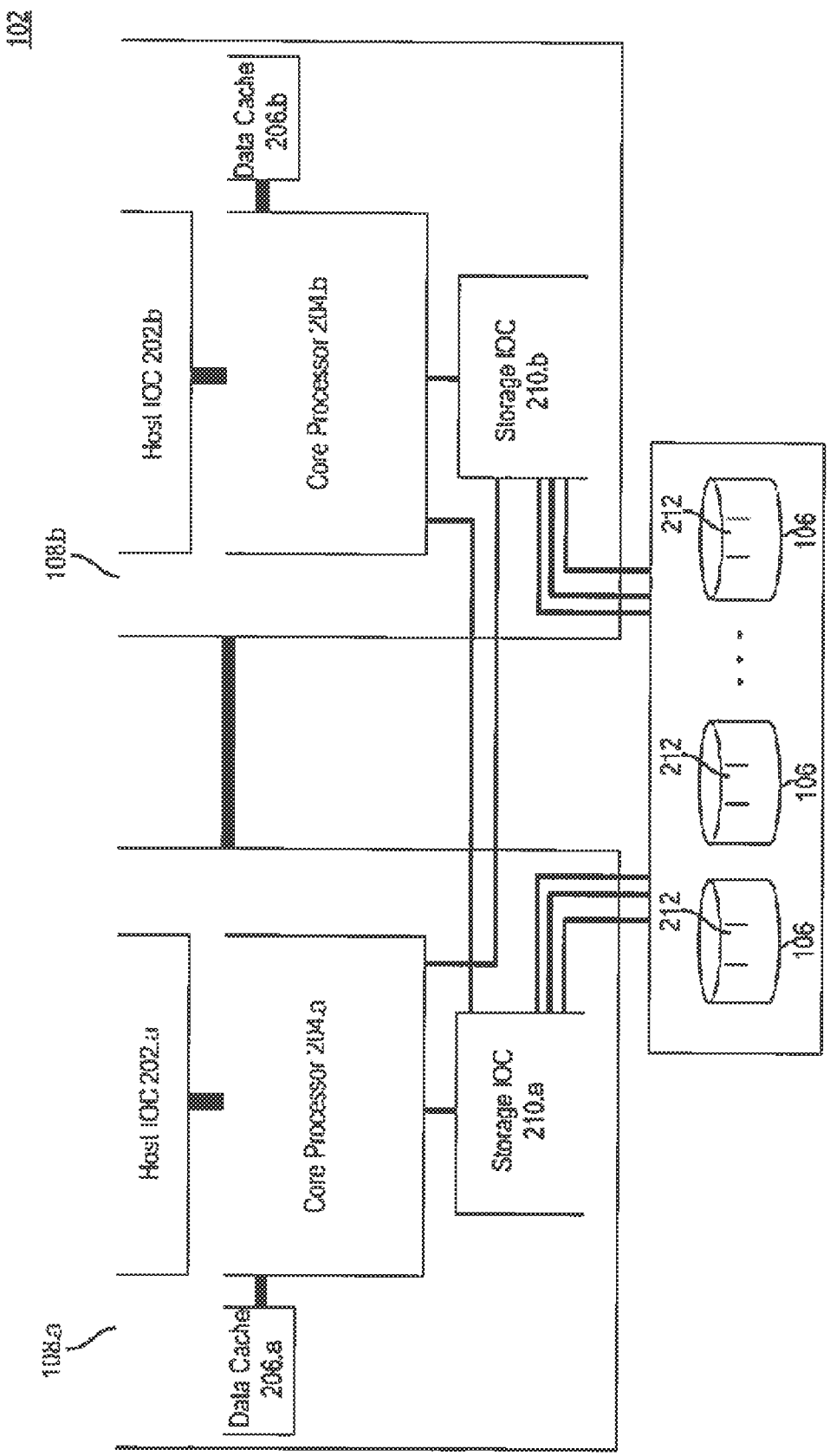
FIG. 2 is a block diagram of the exemplary storage management computing device shown in FIG. 1.
Figure 3:
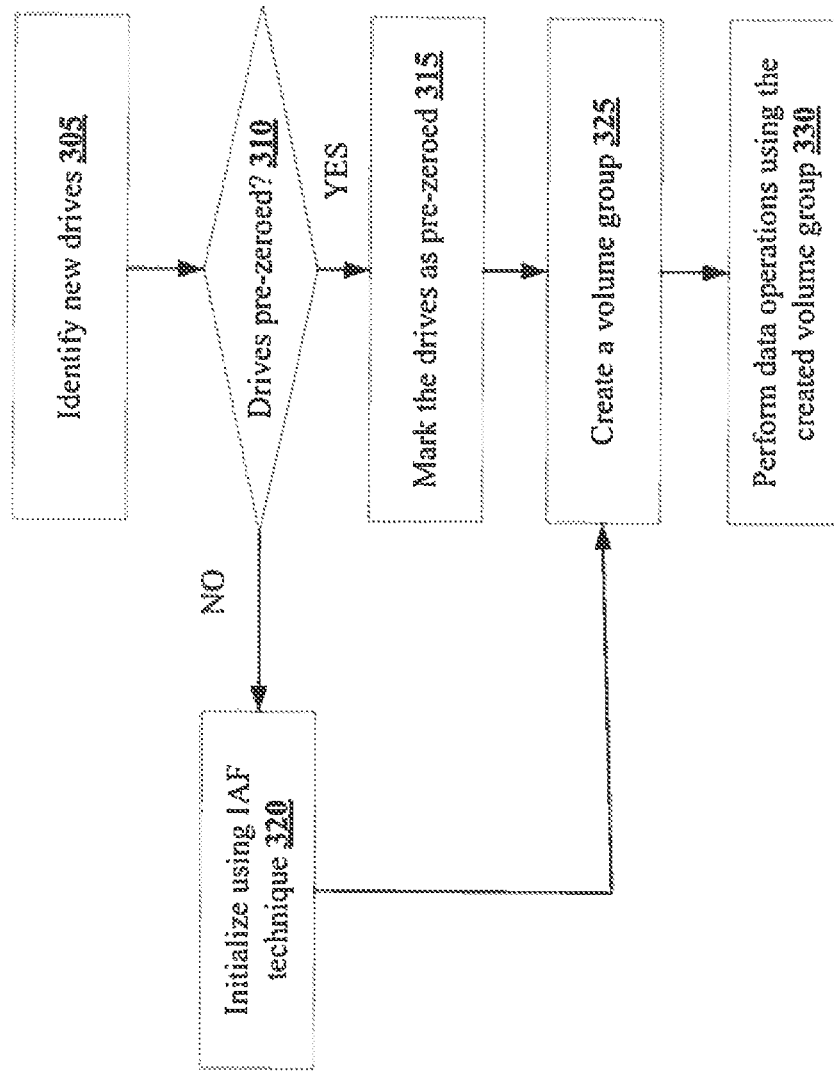
FIG. 3 is a flow chart of an example of a method for reducing initialization duration and performance impact during configuration of storage drives.

This is illustrated, for example, in FIG. 2 which is an organizational diagram of exemplary controller architecture of a storage management computing device 102 according to aspects of the present disclosure. The storage management computing device 102 may include, for example, a first controller 108.a and a second controller 108.b, as well as the plurality of storage devices 106(1)-106(n). As these are redundant for purposes of failover, the first controller 108.a will be described as representative for purposes of simplicity of discussion.

As shown in FIG. 2, the first controller 108.a may include a host input/output controller (IOC) 202.a, a core processor 204.a, a data cache 206.a, and a storage IOC 210.a. The host IOC 202.a may be connected directly or indirectly to one or more host bus adapters (HBAs) 110 and provide an interface for the storage controller 108.a to communicate with the hosts 104. For example, the host IOC 202.a may operate in a target mode with respect to the host 104. The host IOC 202.a may conform to any suitable hardware and/or software protocol, for example including SAS, iSCSI, InfiniBand, Fibre Channel, and/or FCoE. Other suitable protocols include SATA, eSATA, PATA, USB, and FireWire.

The core processor 204.a may be a microprocessor, a microprocessor core, a microcontroller, an application-specific integrated circuit (ASIC), a central processing unit (CPU), a digital signal processor (DSP), a controller, a field programmable gate array (FPGA) device, another hardware device, a firmware device, or any combination thereof. The core processor 204.a may also be implemented as a combination of computing devices, e.g., a combination of a DSP and a microprocessor, a plurality of microprocessors, one or more microprocessors in conjunction with a DSP core, or any other such configuration.

The data cache 206.a may be a memory device such as random access memory (RAM), magnetoresistive RAM (MRAM), flash memory, solid state memory device, hard disk drives, other forms of volatile and non-volatile memory, or a combination of different types of memory. The data cache 206.a may act as a buffer for I/O operations between the hosts 104 and the storage devices 106. In some examples, the data cache 206.a may be battery-backed so that data is not lost during power loss events. The data cache 206.a may be a write-through or a write-back cache, as will be recognized.

The storage IOC 210 a may be connected directly or indirectly to the storage devices 106. The storage IOC 210.a provides an interface for the storage controller 108.a to communicate with the storage devices 106 to write data and read data as requested/needed. For example, the storage IOC 210.a may operate in an initiator mode with respect to the storage devices 106. The storage IOC 210.a may conform to any suitable hardware and/or software protocol, for example including SAS, SATA, iSCSI, Fibre Channel, FCoE, SMB/CFIS, SAMBA, and NFS.

The storage devices 106 may be HDDs, SSDs, optical drives, and/or any other suitable volatile or non-volatile data storage medium. Each storage device 106 may include a drive controller 212 that, among other features used for reading/writing data or otherwise maintaining the storage device 106, is used for PI.

There are several different scenarios in which PI may be received, checked, and/or generated where PI is enabled depending upon the level of support for PI. For example, in an embodiment PI may be supported end-to-end, from a host 104 to the storage devices 106. In one example, a host 104 that initiates a write request may include the write data together with PI to the storage management computing device 102. The host IOC 202.*a* may check the write data against the PI upon receipt from the HBA 110. If the check fails, then the host IOC 202.*a* may request that the host 104 retransmit the request with the write data so that silent data corruption may be avoided. If the check is successful, then the host IOC 202.*a* may pass the write request along to the core processor 204.*a*, which may store the write data with PI into a segment of the data cache 206.*a* associated with the target location of the write.

The write request with the write data and PI is then passed on to the storage IOC 210.*a*. The storage IOC 210.*a* may also check the write data against the PI upon receipt, for example to identify any data corruption that may have occurred between the data cache 206.*a* and the storage IOC 210.*a*. If the check fails, then the storage IOC 210.*a* may query the storage controller 108.*b* to which the data was mirrored. Otherwise, the storage IOC 210.*a* passes the write request with the write data and PI on to the target storage device(s) 106. At the storage device(s) 106, a drive controller may again check the write data against the PI. If the check fails, then the drive controller may request that the write request with data be resent from the data cache 206.*a* or the host 104. Otherwise, the drive controller may write the data as requested, for example by way of data and parity update operations, and update/write the PI for the data block to the associated PI block.

An example of a method for reducing initialization duration and performance impact during configuration of storage drives will now be described herein with reference to FIGS. 1-4B. The exemplary method begins at step 305 wherein the storage management computing device 102 identifies one or more new drives in the system upon booting. Additionally, the storage management computing device 102 writes a signature and basic configuration information in a known location of the identified one or more new drives in the system.

Next in step 310, the storage management computing device 102 determines when the identified one or more new drives have been initialized to a zero value. By way of example only, the storage management computing device 102 determines that the drives have been initialized to zero by checking the product identification and if it a device known to have been initialized to zeros by the manufacturer, storage management computing device 102 then checks the location on the device that contains configuration information. If the blocks of the configuration region contain all zeros, then the device has yet to be used and contains all zeros. Otherwise the configuration region details the extents of the drive which have been used and which still have their initial zero value. In this example, when the storage management computing device 102 determines that the one or more drives have been initialized to a zero value, then the Yes branch is taken to step 315.

In step 315, the storage management computing device 102 modifies and marks the configuration information in each of the one or more new drives as pre-zeroed. Additionally in this example, the storage management computing device 102 initializes data of each of the one or more new drives in configuration file stored within the memory of the storage management computing device 102 as clean (untouched and still containing their initial zero value) or dirty (includes data and does not include initial zero value).

However back in step 310, when the storage management computing device 102 determines that the one or more new drives have not been initialized to zero, then the No branch is taken to step 320.

In step 320, the storage management computing device 102 initializes the one or more new drives using the immediate availability format (IAF) technique illustrated in U.S. Pat. No. 9,367,245 which is hereby incorporated by reference in its entirety.

Next in step 325, the storage management computing device 102 creates a volume group using the one or more new drives that has been marked as pre-zero. In this example, when a drive from the one or more new drives has been used in the created volume group, it is no longer clean for the set of blocks used by the volume group. Accordingly, if the volumes created for read/write to the created volume group did not consume all of the volume group capacity, then the drives in the volume group will have known LBA extents that are still clean (i.e. untouched and still containing their initial zero value).

Next in step 330, the storage management computing device 102 assists with data operation being performed on the created volume group and the further illustration of this step will be further described below.

Further in this example, the default value for PI data for a pre-zeroed drive, or a drive after a FORMAT command is all FFs. Further, the PI data may be set to all FFs by a Write Same or UNMAP command. This "all FFs" PI data pattern can be used as an indication that a volume group RAID stripe is all zeros and has not had correct PI data set. In other words, when a Read gets a PI error, the storage management computing device 102 first checks to see of the PI data is all FFs. When the storage management computing device 102 determines that the PI data is all FFs (or some known constant value the device uses for uninitialized PI e.g. all 00s), then it is determined not to be a PI error, but rather an indication the stripe needs to be initialized. In this example, the first access to any stripe in a volume will be one of three cases: first normal Read—if all FFs PI error, insert zeros into cache for the entire stripe, compute correct PI data and use full-stripe write to set the PI; second is a read of read-modify-write—if all FFs PI error, insert zeros into cache to fill the rest of the stripe (leaving the write data untouched), compute parity and PI data and use full-stripe write; and third is a full-stripe write. In all cases the first access to a RAID stripe will initialize the entire stripe with correct PI data.

Using this technique, processing cycles is saved and the input/output time when compared to the IAF technique is significantly reduced. Additionally, when a volume or volume group is deleted, the storage management computing device 102 updates the list of clean/dirty extents in the configuration information stored on each drive (disk array configuration storage). Furthermore in this example, a slow background operation is started by the storage management computing device 102 to re-initialize the unused dirty extents back to having contents of all zeros.

In this example, when a PI enabled volume is deleted the process to set the data back to the all zeros, all-FFs PI state can be started with background process that uses the Write Same or UNMAP commands. This re-zero technique is performed by the storage management computing device 102 at a low priority as re-provisioning of the capacity is not required to be performed by the storage management computing device 102 thereby not affecting the overall performance.

Figure 4B:
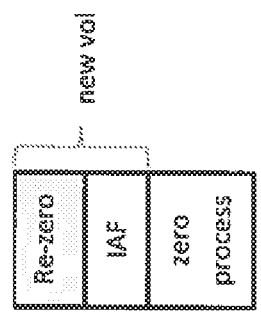
FIGS. 4A-4B are exemplary illustration of the data operation performed on the storage drives.
Figure 4A:
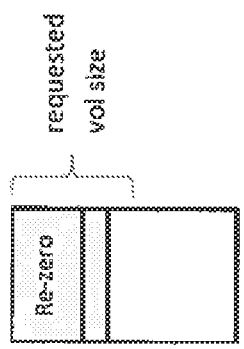

In this example, when a new volume is created from an existing volume group before the re-zero process is complete, and then existing IAF technique is used to complete the initialization of the remaining blocks. As shown in FIG. 4A, the re-zero process has progressed part way through the deleted volume space when a user requests a new volume be created larger than the zeroed out capacity. The volume is created and the normal IAF process is started, but only on the portion of the volume that has not already been re-zeroed out as illustrated in FIG. 4B. When the IAF completes the remainder of the volume, the re-zero process will resume on the remaining drives. Using this technique, the technology disclosed herein provides advantages of writing to LBA in an uninitialized stripe by reading data and parity drives and writing all data and parity drives (The storage management computing device 102 filled in zeroes across the remaining blocks in the RAID stripe and correct PI data for all blocks of the RAID stripe).

Additionally in this example, each volume is comprised of a set of drives in the volume group created in step 325 that is doing RAID. For example, in a 4+1 RAID 5 configuration with a stripe depth of 128K, the first drive in the created virtual group has capacity of 128K and only when all of 128K is used, the next drive in the virtual group is used. (128K stripe depth)*4 data drives)=512K stripe size. Accordingly in this example, only after data has been striped across the first RAID stripe, the data on the next RAID stripe is striped. Further in this example, every read or write will map to one or more RAID stripes. If a write is large enough to cover an entire stripe (e.g. 512K in example above) then the storage management computing device 102 performs a full stripe write. In this example, the state of the RAID stripe is not determined because the entire stripe is overwritten and the new parity is generated based solely on the new data, although the new parity can be generated using other types or amounts of data. Alternatively, if a write does not cover an entire RAID stripe, then the RAID algorithm which is hereby incorporated by its reference in its entirety, does a Read-Modify-Write sequence. By way of example, old data and old parity are read and xor operation is performed on them. Next, the new data is xor into the parity and then new data and new parity is written by the storage management computing device 102. Additionally, in this example, for the RAID process to be able to successfully recover lost data after a drive failure, data and parity MUST match prior to the RWM sequence.

This technology provides a number of advantages including providing methods, non-transitory computer readable medium and devices for reducing initialization duration and performance impact during configuration of storage drives. The technology disclosed only initializes the drives that are not zeroed out thereby significantly reducing the duration that is required to perform initialization of the blocks of drives. Additionally, the technology disclosed provides the user access to the volumes prior to the initialization of the non-zeroed out drives thereby increasing the performance of the arrays and significantly decreasing the latency.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
   determining, by a storage controller, that data blocks of a stripe in a volume are unmapped based on protection information corresponding to the data blocks including a known constant value;
   computing, by the storage controller in response to determining that the protection information includes the known constant value, values for the protection information for the stripe; and
   setting, by the storage controller, the values for the protection information data with a full-stripe write.

2. The method of claim 1, wherein the protection information is received in response to a read command, the method further comprising:
   inserting, by the storage controller, zeros into a cache of the storage controller for a full amount of the stripe.

3. The method of claim 1, wherein the protection information is received in response to a read-modify-write command, the method further comprising:
   inserting, by the storage controller, zeros into a cache of the storage controller for a portion of the stripe not containing write data.

4. The method of claim 1, wherein the protection information is received in response to a write command.

5. The method of claim 1, further comprising:
   receiving, by the storage controller, a read error for the stripe, wherein the determining is in response to the read error.

6. The method of claim 1, further comprising:
   providing, by the storage controller, a re-zero command to reinitialize the stripe.

7. The method of claim 1, further comprising:
   starting, by the storage controller, a background re-initialization process in response to receiving a request for a new volume with a size larger than a zeroed-out capacity, the background re-initialization process being limited to a portion of the new volume that has not already been re-zeroed.

8. A computing device comprising:
   a memory containing machine readable medium comprising machine executable code having stored thereon instructions for performing a method of reducing initialization duration;
   a processor coupled to the memory, the processor configured to execute the machine executable code to cause the processor to:
      receive a data operation command to data blocks of a stripe in a volume;
      receive protection information corresponding to the data blocks in response to the data operation command;
      determine that the data blocks of the stripe are unmapped based on the received protection information including a known constant value; and
      set a new value for the protection information, based on the determination that the data blocks are unmapped, with a full-stripe write of the stripe.

9. The computing device of claim 8, wherein the protection information is received in response to a read error to the data operation command.

10. The computing device of claim 8, wherein the processor is further configured to execute the machine executable code to cause the processor to:
insert zeros into a cache of the computing device for a full amount of the stripe, the data operation command comprising a read command.

11. The computing device of claim 8, wherein the processor is further configured to execute the machine executable code to cause the processor to:
insert zeros into a cache of the computing device for a portion of the stripe not containing write data, the data operation command comprising a read-modify-write command.

12. The computing device of claim 8, wherein the data operation command comprises a write command.

13. The computing device of claim 8, wherein the processor is further configured to execute the machine executable code to cause the processor to:
start a re-zero background process to reinitialize the stripe.

14. The computing device of claim 8, wherein the processor is further configured to execute the machine executable code to cause the processor to:
start a re-zero background process to reinitialize a portion of a new volume that has not already been re-zeroed.

15. A non-transitory machine readable medium having stored thereon instruction code for performing a method, the instruction code when executed by at least one machine, causes the at least one machine to:
receive a read error in response to a data operation command to data blocks of a stripe in a volume;
obtain protection information corresponding to the data blocks in response to the read error;
compute, in response to a determination that the data blocks of the stripe are unmapped based on the obtained protection information including a known constant value, new values for the protection information; and
set the new values for the protection information with a full-stripe write of the stripe.

16. The non-transitory machine readable medium of claim 15, the instruction code when executed by the at least one machine further causes the at least one machine to:
insert zeros into a cache of the machine for a full amount of the stripe, the data operation command comprising a read command.

17. The non-transitory machine readable medium of claim 15, the instruction code when executed by the at least one machine further causes the at least one machine to:
insert zeros into a cache of the machine for a portion of the stripe not containing write data, the data operation command comprising a read-modify-write command.

18. The non-transitory machine readable medium of claim 15, wherein the data operation command comprises a write command.

19. The non-transitory machine readable medium of claim 15, wherein the read error is based on the protection information including the known constant value.

20. The non-transitory machine readable medium of claim 15, the instruction code when executed by the at least one machine further causes the at least one machine to:
start a re-zero background process to reinitialize a portion of a new volume that has not already been re-zeroed.

* * * * *